March 1, 1955
S. SILVERMAN
2,702,956
MIRROR CONSTRUCTION
Filed Oct. 13, 1953
4 Sheets-Sheet 1
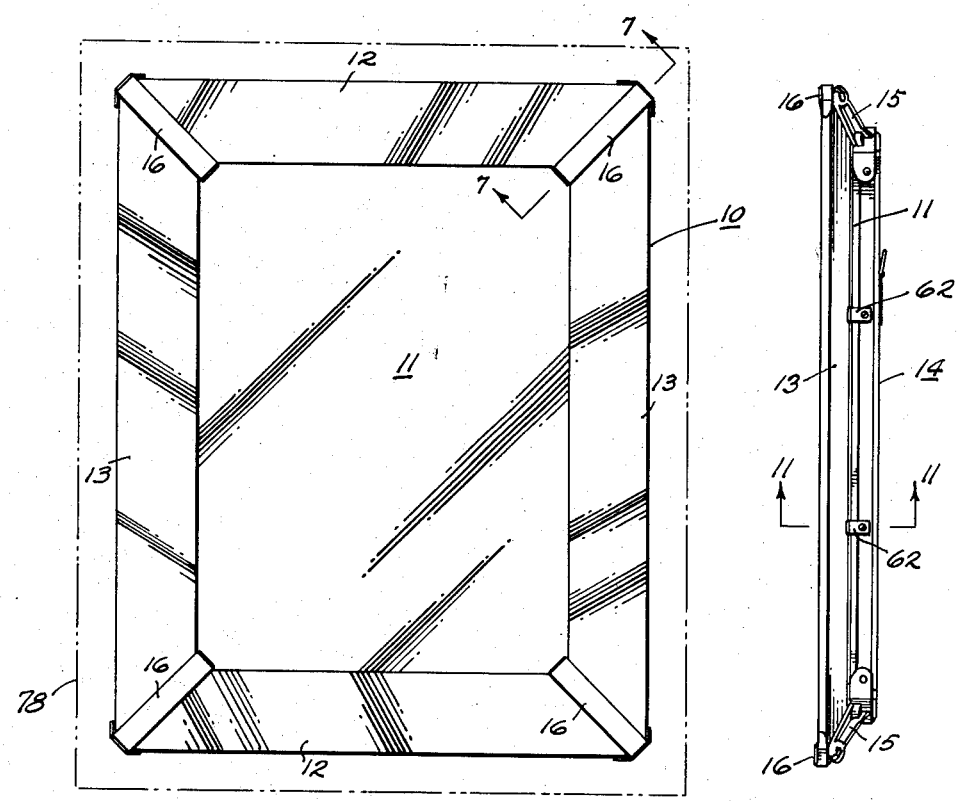
Fig. 1
Fig. 2
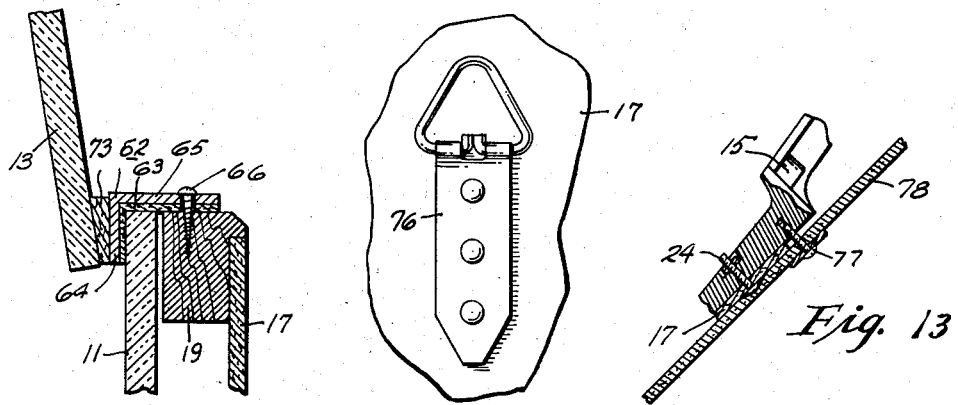
Fig. 11
Fig. 12
Fig. 13
INVENTOR.
SEBET SILVERMAN
BY
ATTORNEY.

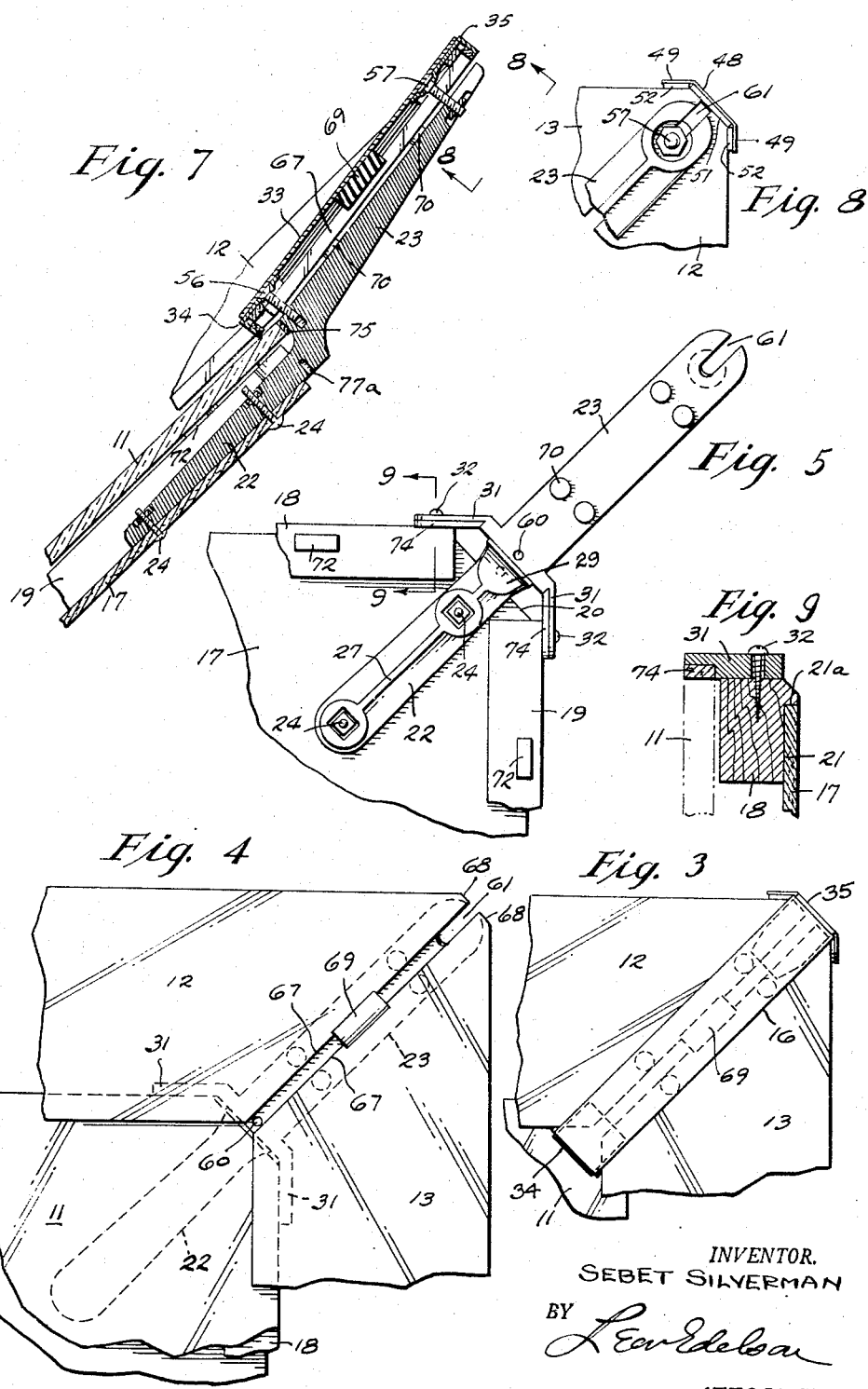

March 1, 1955  S. SILVERMAN  2,702,956
MIRROR CONSTRUCTION

Filed Oct. 13, 1953

INVENTOR.
SEBET SILVERMAN
BY
Leon Edelson
ATTORNEY.

March 1, 1955  S. SILVERMAN  2,702,956
MIRROR CONSTRUCTION
Filed Oct. 13, 1953  4 Sheets-Sheet 4

INVENTOR.
SEBET SILVERMAN
BY
ATTORNEY

United States Patent Office 2,702,956
Patented Mar. 1, 1955

2,702,956

MIRROR CONSTRUCTION

Sebet Silverman, Margate, N. J., assignor to The Nurre Companies, Inc., Egg Harbor City, N. J., a corporation of Indiana Application October 13, 1953, Serial No. 385,850

13 Claims. (Cl. 40—156)

This invention relates to mirrors and the like and is more particularly concerned with means for ornamentally framing the same.

A principal object of the present invention is to provide novel supporting means for a mirror and for ornamental elements which are disposed about the periphery of the mirror and which are transparent so that a wall upon which the unit is hung is visible through the transparent elements.

Another object of the present invention is to incorporate in such novel means structure for adequately supporting the opposed terminal portions of adjacent pairs of the ornamental elements.

Still another object of the present invention is to provide such novel means to which there may be secured independently of one another the mirror on the one hand and the ornamental elements on the other.

Other objects and advantages of the present invention will appear more fully hereinafter, it being understood that the specific embodiments of the invention described herein are illustrative and that modifications thereof falling within the scope of the appended claims will be apparent to persons skilled in the art.

In the drawings:

Figure 1 is a front view of a unit embodying the present invention.

Figure 2 is a side elevational view of the unit shown in Figure 1.

Figure 3 is an enlarged front view of a fully assembled corner of the unit shown in Figure 1.

Figure 4 is the same as Figure 3, the corner fitting being omitted to expose the mitered end portions of the ornamental elements.

Figure 5 is the same as Figure 4, the mirror and the ornamental elements being omitted to expose the underlying structure.

Figure 7 is an enlarged sectional view on line 7—7 of Figure 1.

Figure 8 is an enlarged view on line 8—8 of Figure 7.

Figure 9 is an enlarged sectional view on line 9—9 of Figure 5.

Figure 11 is an enlarged sectional view on line 11—11 of Figure 2.

Figure 12 is an enlarged fragmentary view looking at the back of the unit and showing a fitting for hanging the unit.

Figure 13 is an enlarged sectional view as indicated by line 7—7 of Figure 1, parts being omitted for the sake of clarity, showing the unit secured to a member which facilitates packing and shipping of the unit.

Figure 10:
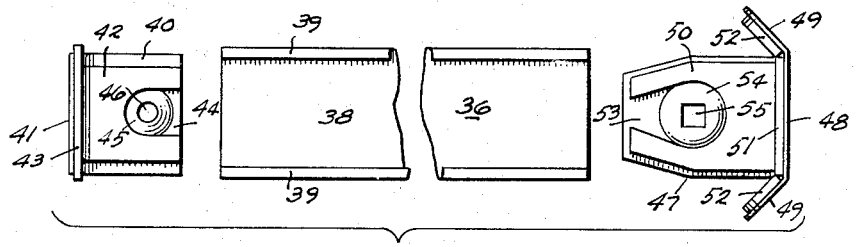
Figure 10 is an enlarged bottom view showing a corner fitting in unassembled condition.
Figure 6:
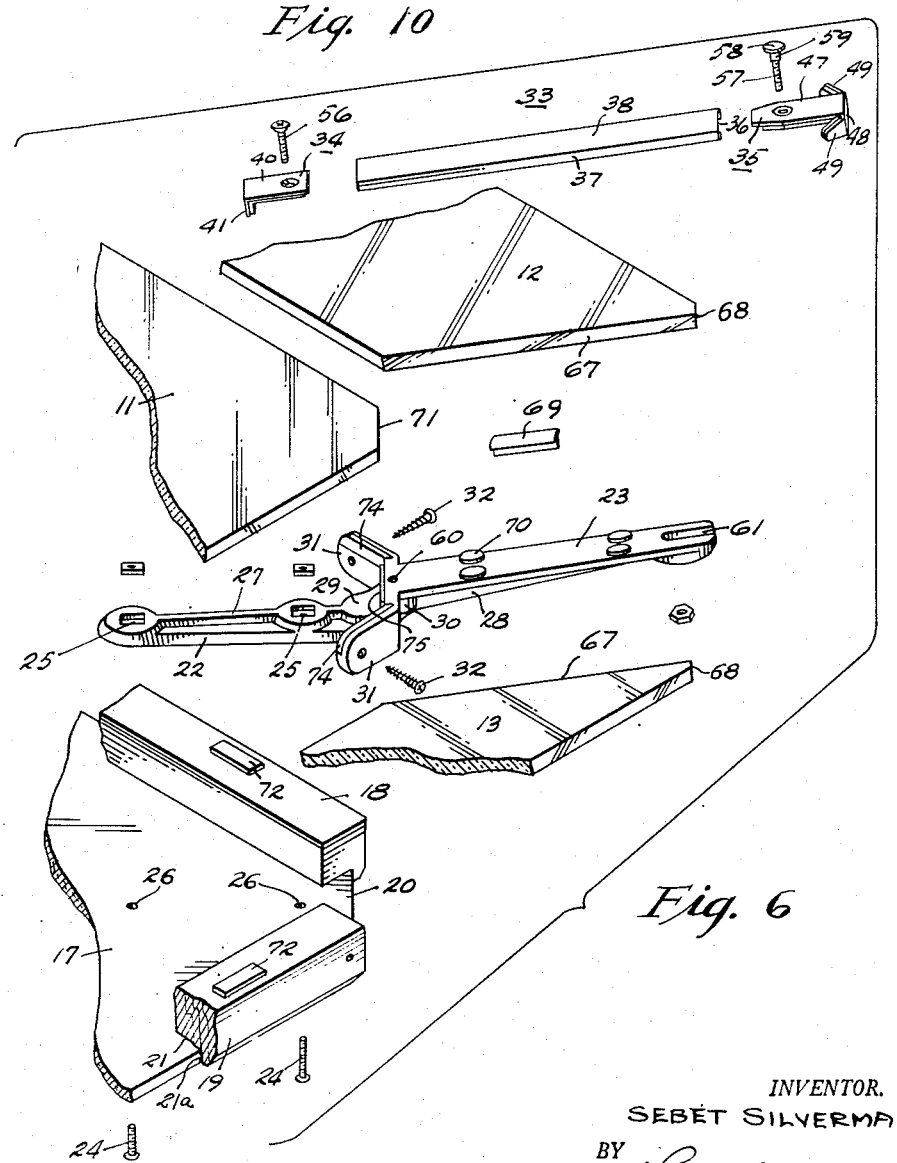
Figure 6 is an exploded view of the construction shown in Figure 3.

Referring particularly to Figures 1 through 13, the present invention is embodied in a unit comprising a frame 10 in which there is mounted a member 11, the frame 10 comprising a set of elements 12—12 and 13—13 ornamentally disposed about the member 11, and novel means supporting the member 11 and the ornamental elements 12—12 and 13—13, the aforesaid means including a section 14 which is disposed in back of the member 11 and which carries a set of brackets 15 and fittings 16 between which the ornamental elements 12—12 and 13—13 are clamped.

The back section 14 is provided with a rectangular panel 17 of wood, Masonite or other suitable sheet material, and wooden top and bottom mouldings 18—18 and side mouldings 19—19. The corners which would be formed by extending the edges of the panel 17 are cut off along lines 20, and the terminal portions of the mouldings 18—18 and 19—19 proximate the cuts 20 are set back from one another as shown.

The mouldings 18—18 and 19—19 are generally rectangular in transverse cross section, being undercut for forming a recess having right angularly related surfaces 21 and 21ª. Each moulding is seated with its surface 21 upon the associated marginal portion of panel 17 and is further positioned with its surface 21ª in close abutting relation to the proximate edge of the panel 17, being secured in such position by nails (not shown) driven through the back of the panel 17 and into the moulding.

The brackets 15 are four in number, one being disposed at each corner of the panel 17. Each bracket 15 is provided with an elongated body having a part 22 and an integral appendage 23. The part 22 is seated upon the panel 17 and is secured thereto by means of a pair of bolts 24—24 each projected through an aperture 25 in the part 22 and an aligned aperture 26 in the panel 17. When thus secured to the panel 17, the part 22 is disposed between the proximate terminal portions of the associated mouldings 18 and 19 preferably along a line which bisects the angle formed by these mouldings. The appendage 23 extends outwardly from the corner of the panel 17 preferably along the same line as the part 22. Furthermore, the appendage 23 is disposed in forwardly offset relation to the part 22, preferably sloping slightly outwardly and forwardly therefrom. The part 22 and the appendage 23 are suitably provided respectively with reinforcing ribs 27 and 28 and also respectively with bosses 29 and 30. Extending from opposite sides of the bracket body in the region where the part 22 and the appendage 23 are joined together there are a pair of integral arms 31—31 secured by wood screws 32—32 respectively to the associated mouldings 18 and 19, being positioned thereby in outwardly disposed side abutting relation thereto.

The fittings 16 are four in number, one being disposed over the appendage 23 of each bracket 15. Each fitting 16 comprises a main body part 33 and additional parts 34 and 35 associated respectively with the opposite end portions of the main body part 33. The latter is an elongated sheet metal element the longitudinally extending marginal portions of which are turned to form a channel 36 provided with parallel side walls 37—37 disposed normal to a base wall 38 and provided with flanges 39—39 respectively extending inwardly from the side walls 37—37 in coplanar relation to one another.

The fitting part 34 comprises a strip of sheet metal lined with suitable shock-absorbing material, such as sheet rubber, felt, plastic, cardboard or the like, glued or otherwise suitably secured to one face thereof. This part is L-shaped and is formed with a long leg 40 and a short leg 41, the inside of the former being lined with a shock-absorbing strip 42 and the inside of the latter being lined with a shock-absorbing strip 43. The strip 42 is of a lesser width than the leg 40, and the strip 43 is of a greater width than the leg 41. In addition, the strip 42 is provided with an open slot 44 which receives a depressed portion 45 which is centrally apertured as at 46.

The fitting part 35 also comprises a strip of sheet metal lined with shock-absorbing material of the character aforesaid, glued or otherwise suitably secured to one face thereof. This part is L-shaped and is formed with a long leg 47 and a short leg 48, the latter being provided with wing elements 49—49 turned out of the plane thereof and extending respectively from opposite sides thereof preferably at a right angle to one another. The inside of the leg 47 is lined with a shock-absorbing strip 50 which is of a lesser width than the leg 47, while the leg 48 is lined with shock-absorbing strips 51 and 52—52. The strip 50 is provided with an open slot 53 which receives a depressed portion 54 which is provided centrally with a square aperture 55.

In its assembled condition the fitting 16 is provided with a countersunk head bolt 56 projected through the aperture 46 in the leg 40 of the part 34, the aforementioned head being received by the depressed portion 45. The leg 40 is slidably fitted into the channel 36 at one end of the main body part 33, and when fully engaged thus the strip 42 underlying the leg 40 is disposed between the flanges 39—39 of the main body part 33 while the strip 43 underlying the leg 41 is disposed below the same, the leg 41 being disposed in abutting relation to the corresponding end portions of the flanges 39—39 of the main body part 33.

The fitting 16 is also provided with a bolt 57 projected through the aperture 55 in the leg 47 of the part 35. This bolt has a flat head 58 and a square shank 59, the former being received by the depressed portion 54 and the latter in the square aperture 55. The leg 47 is slidably fitted into the channel 36 at the other end of the main body part 33, and when fully engaged thus the strip 50 underlying the leg 47 is disposed between the flanges 39—39 of the main body part 33 while the strips 51 and 52—52 underlying the leg 48 are disposed below the same, the leg 48 being disposed in abutting relation to the corresponding end portions of the flanges 39—39 of the main body part 33.

For securing a fitting 16 to its bracket 15 there is provided at the inner end of the appendage 23 of the bracket 15 an opening 60 which threadedly receives the bolt 56, and there is provided at the outer end of the same a longitudinally extending open slot 61 through which the bolt 57 is projected. It will be observed that the projection of the bolt 56 into the opening 60 and of the bolt 57 through the slot 61 is such as to position the fitting 16 over the appendage 23 in spaced relation thereto.

The novel means for supporting the member 11 and the ornamental elements 12—12 and 13—13 includes a set of clips 62 carried by the back section 14, there being preferably a spaced pair of such clips for each moulding 18—18 and 19—19. Each clip 62 comprises a strip of sheet metal lined with shock-absorbing material 63 of the character aforementioned, glued or otherwise suitably secured to the inner face thereof. The clip 62 is L-shaped and is formed with a short leg 64 and a long leg 65, through the latter of which there is projected a wood screw 66 for securement of the clip 62 to its moulding 18—18 or 19—19 with the leg 64 in overlying spaced relation to the moulding.

As set forth hereinabove, the elements 12—12 and 13—13 which are ornamentally disposed about the member 11 are component parts of the frame 10. The elements are preferably made of clear plate glass optionally provided with a decorative design. Each is a broad strip having inner and outer parallel side edges extending longitudinally thereof and having opposite end portions which terminate respectively at miter-forming edges 67—67, the sharp corners which would be formed by extending the outer side edges and the edges 67—67 being cut off respectively on lines 68—68. When the elements 12—12 and 13—13 are ornamentally disposed as aforesaid, the opposed end portions of any adjacent pair elements 12 and 13 are positioned over the appendage 23 of the associated bracket 15. For maintaining the aforementioned opposed end portions in spaced relation to one another there is provided an elongated element 69 made of any suitable shock absorbing material. The element 69 is T-shaped in transverse cross section, and the stem thereof is snugly fitted between the miter-forming edges 67—67. Interposed between the aforementioned end portions and the appendage 23 are suitable shock absorbing pads 70, glued or otherwise secured to the appendage 23.

The fittings 16, when positioned as described hereinabove and their bolts 56 and 57 drawn tight, are each disposed in covering relation to the opposed end portions of a pair of elements 12 and 13, the elements 12 and 13 each being disposed in a forwardly and outwardly sloping plane. The aforementioned end portions are thereby firmly clamped to the underlying appendage 23 of the bracket 15. The base wall 38 of the main body 33 of the fitting 16 is held in firm engagement with the head of the T-shaped element 69, and the shock-absorbing strips which line the parts 34 and 35 are held in firm engagement with the opposed surfaces of the elements 12 and 13.

The member 11 is in the form of a plate glass mirror which is rectangular in shape, the corners which would be formed by extending the edges thereof being cut off respectively on lines 71. The mirror 11 is mounted in its frame 10 with its outer marginal portions interposed between the mouldings 18—18 and 19—19 on the one hand and the elements 12—12 and 13—13 on the other hand. Interposed between the mirror 11 and the mouldings 18—18 and 19—19 are suitable shock-absorbing strips 72, glued or otherwise secured to the mouldings 18—18 and 19—19, while interposed between the mirror 11 and the elements 12—12 and 13—13 are the legs 64 of the clips 62. When a clip 62 is secured as set forth hereinabove, the material 63 with which it is lined is held in firm engagement with the opposed surfaces of the mirror 11. Interposed between the legs 64 of the clips 62 and the elements 12—12 and 13—13 are suitable shock-absorbing strips 73. The arms 31—31 of each bracket 15 are each suitably recessed to receive a shock-absorbing strip 74, and the inner end portion of the appendage 23 is provided with a shock-absorbing strip 75. The strips 74—74 and 75 are glued or otherwise secured in place and are disposed in engagement with the opposed edges of the mirror 11. It will be observed that the mirror 11 is thus secured in spaced relation to the panel 17 of the back section 14 of the frame 10, and that the elements 12—12 and 13—13 are disposed with their inner marginal portions in overlapping relation to the outer marginal portions of the mirror 11. In this connection, it will be noted that the inner edges of the elements 12—12 and 13—13 define the sight of the frame 10.

For hanging the unit there may be provided on the back thereof a suitable set of conventional attachments 76 (see Figure 12), while for facilitating packing and shipping the same each of the parts 22 of the fittings 15 is provided with a tapped hole 77ᵃ for receiving a bolt 77 projected through a shipping member 78. It will be appreciated that when the unit is secured to the member 78 by a plurality of bolts 77, it is easy to pack for safe shipment.

To assemble the frame 10 and the mirror 11, the brackets 15 are initially so bolted to the panel 17 of the back section 14, as to not only locate the arms 31 of the several brackets 15 accurately in position for receiving the mirror 11, but also locate the appendages 23 of the several brackets 15 accurately in position to receive the elements 12—12 and 13—13. Then the mirror is positioned and permanently secured in place by use of the clips 62, and the elements 12—12 and 13—13 are positioned and secured in place by use of the fittings 16. Each of the latter is secured in place by first mounting the fitting part 34 and turning the bolt 56 into the tapped aperture 60. Then the rest of the fitting in assembled condition is positioned by axially moving the same relatively to the part 34 so that the threaded portion of the bolt 57 passes through the open end of the slot 61. A nut threaded on the bolt 57 secures the same in place. To disassemble the unit, the procedure just set forth is reversed.

When the frame 10 and mirror 11 are thus assembled, each element 12—12 and 13—13 is disposed in a plane which slopes forwardly and outwardly relative to the plane of the mirror 11. It should be noted, however, that the fittings 15 may be constructed with their appendages 23 extending outwardly in some other angular relation to their parts 22, e. g., so as to position the elements 12—12 and 13—13 in a plane parallel to the plane of the mirror 11, that the fittings 15 may be constructed with their appendages 23 disposed at an angle relative to their parts 22 so as to accommodate elements 12—12 which are not substantially of the same width as the elements 13—13, and that the fittings 15 may be constructed with arms 31 adapted to receive a mirror 11 which is not rectangular in shape. It should particularly be noted that a primary function of the arms 31 of the fittings 15 is to help position the appendages 23 in the exact desired position.

The width of the main body part 33 of the fitting 16 is quite substantial and, therefore, conceals the edges of the members that come together thereunder. Consequently, these edges need not be shaped with the same degree of preciseness as would be necessary if they were to be exposed to view. Even slight variations in the widths of adjacent elements 12 and 13 are accommodated by the fitting 16, which, it will be apparent, is neat and does not detract from the appearance of the frame 10.

The main body part 33 and the part 35 of the fitting 16 can be furnished to suit the particular elements 12—12 and 13—13 being used, while the brackets 15 and the part 34 remain the same. In other words, a manufacturer can standardize on parts such as the bracket 15 and the part 34 and make the main body 33 and the part 35 as required.

Figure 14:
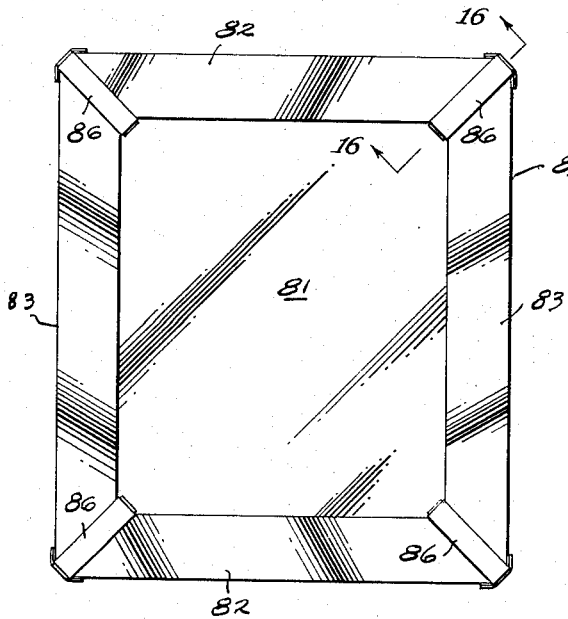
Figure 14 is a front view of another unit embodying the present invention.
Figure 15:
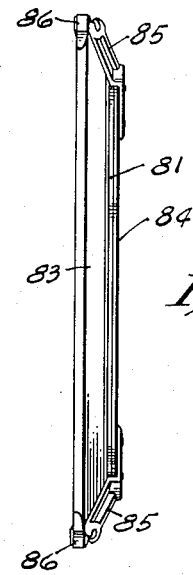
Figure 15 is a side elevational view of the unit shown in Figure 14.
Figure 16:
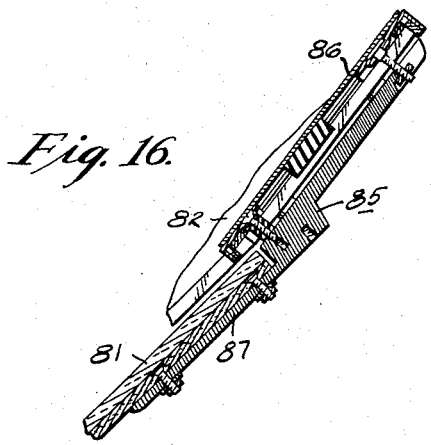
Figure 16 is an enlarged sectional view on line 16—16 of Figure 14.
Figure 17:
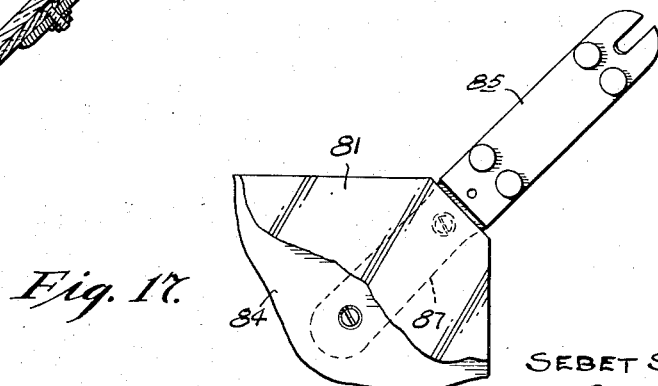
Figure 17 is an enlarged front view of a corner of the unit shown in Figure 14, the ornamental elements being omitted to expose the underlying structure.

Referring particularly to Figures 14 through 17, the present invention is embodied in a unit comprising a frame 80 in which there is mounted a member 81, the frame 80 comprising a set of elements 82—82 and 83—83 ornamentally disposed about the member 81, and novel means supporting the member 81 and the ornamental elements 82—82 and 83—83, the aforesaid means including a section 84 which is disposed in back of the member 81 and which carries a set of brackets 85 and fittings 86 between which the ornamental elements 82—82 and 83—83 are clamped.

The back section 84 is substantially the same as the back section 14 hereinabove described, differing only in that the top, bottom and side mouldings are omitted. The brackets 85 are four in number, one being disposed at each corner of the panel or back section 84. These brackets are substantially the same as the brackets 15 previously described except that their inner parts 87, corresponding to the parts 22 of the brackets 15, are formed as shown to engage the back of the panel or back section 84 and except that the arms 31 are omitted. The fittings 86 are identical with the fittings 16 previously described, there being one for each fitting 85. The ornamental elements 82—82 and 83—83 are similar respectively to the elements 12—12 and 13—13 previously described, while the member 81 is similar to the member 11 previously described.

To assemble the frame 80 and the mirror member 81, countersunk head bolts are used to secure the brackets 85 to the panel or back section 84, whereupon they should be ready for receiving the mirror 81 and the ornamental elements 82—82 and 83—83. The mirror is now positioned flat upon the panel or back section 84 and, if desired, secured thereto by an adhesive agent. The elements 82—82 and 83—83 are positioned next and secured in place by use of the fittings 86 as previously described in the case of the fittings 16. It is believed that a further detailed description of the construction and operation of this second embodiment of the invention is not essential to a clear understanding thereof and, therefore, the same is omitted.

Although the members 11 and 81 are shown and described as being mirrors, applicant does not intend to be limited specifically to a construction employing a mirror since the member mounted in the frame may assume many other forms. In addition, although the elements 12—12, 13—13, 82—82 and 83—83 are shown and described as clear plate glass elements, optionally provided with a decorative design, applicant does not intend to be specifically limited to such a construction since these elements, also, may assume many other forms, for example, wood, or plastic materials. Furthermore, applicant does not intend to be limited specifically to a construction of frame having the rectangular shape shown and described herein, such shape being shown only for the purpose of illustration. Still further, applicant does not intend to be limited to a construction wherein the fittings 16 and 86 are made of sheet metal as other materials might readily be substituted. Accordingly, it will be understood that the construction of the present invention, as herein illustrated and described, is susceptible of various changes and modifications which may be made from time to time without departing from the general principles or real spirit of the present invention, and it is accordingly intended to claim the same broadly, as well as specifically, as indicated in the appended claims.

What is claimed as new and useful is:

1. In combination, a frame and a member mounted therein, said frame comprising a section disposed in back of said member and generally corresponding thereto in shape and size, a plurality of elongated ornamental elements disposed about said member, said ornamental elements being provided with broad forwardly presenting surfaces, the inner marginal portions of said ornamental elements being disposed in overlapping relation to the outer marginal portion of said member, and each pair of opposed end portions of said ornmental elements being complementally mitered across their broad forwardly presenting surfaces, a plurality of appendages extending outwardly from said back section, there being one such appendage disposed in underlying relation to each pair of opposed end portions of said ornamental elements, and a plurality of fittings, there being one such fitting disposed in covering relation to each pair of opposed end portions of said ornamental elements, the latter being thereby clamped between said fittings and their underlying appendages.

2. In combination, a frame and a member mounted therein, said frame comprising a section disposed in back of said member and generally corresponding thereto in shape and size, a plurality of elongated ornamental elements disposed about said member, said ornamental elements being provided with broad forwardly presenting surfaces, the inner marginal portions of said ornamental elements being disposed in overlapping relation to the outer marginal portion of said member, and each pair of opposed end portions of said ornamental elements being complementally mitered across their broad forwardly presenting surfaces, a plurality of brackets secured to said back section and provided with elongated appendages extending outwardly from said back section, there being one such appendage disposed in underlying relation to each pair of opposed end portions of said ornamental elements, and a plurality of elongated fittings, said fittings being provided with broad forwardly presenting surfaces and being detachably secured to said appendages, there being one such fitting disposed in covering relation to each pair of opposed end portions of said ornamental elements, the latter being thereby clamped between said fittings and their underlying appendages.

3. In combination, a frame and a member mounted therein, said frame comprising a section disposed in back of said member and generally corresponding thereto in shape and size, a plurality of elongated ornamental elements disposed about said member, said ornamental elements being provided with broad forwardly presenting surfaces, the inner marginal portions of said ornamental elements being disposed in overlapping relation to the outer marginal portion of said member, and each pair of opposed end portions of said ornamental elements being complementally mitered across their broad forwardly presenting surfaces, a plurality of brackets secured to said back section and provided with elongated appendages extending outwardly from said back section, said appendages being provided with broad forwardly presenting surfaces, there being one such appendage disposed in underlying relation to each pair of opposed end portions of said ornamental elements, and a plurality of elongated fittings, said fittings being provided with broad forwardly presenting surfaces and each with opposite end portions detachably secured respectively to corresponding end portions of the underlying appendage, there being one such fitting disposed in covering relation to each pair of opposed end portions of said ornamental elements, the latter being thereby clamped between said fittings and their underlying appendages.

4. In combination, a frame and a member mounted therein, said frame comprising a section disposed in back of said member and generally corresponding thereto in shape and size, a plurality of elongated ornamental elements disposed about said member, said ornamental elements being provided with broad forwardly presenting surfaces, the inner marginal portions of said ornamental elements being disposed in overlapping relation to the outer marginal portion of said member, and each pair of opposed end portions of said ornamental elements being complementally mitered across their broad forwardly presenting surfaces, a plurality of brackets secured to said back section and provided with elongated appendages extending outwardly from said back section, said appendages being provided with broad forwardly presenting surfaces which slope forwardly and outwardly, there being one such appendage disposed in underlying relation to each pair of opposed end portions of said ornamental elements, and a plurality of elongated fittings, said fittings being provided each with a pair of parts detachably secured respectively to the opposite end portions of the underlying appendage in fixed relation to one another, and a main body part in the form of a longitudinally extending channel, said main body part being disposed between said pair of parts with the latter slidably engaged respectively in opposite end portions of said channel, there being one such fitting disposed in covering relation to each pair of opposed end portions of said ornamental elements, the latter being thereby clamped between said fittings and their underlying appendages and being disposed thereby in forwardly and outwardly sloping relation to said member.

5. In combination, a frame and a member mounted therein, said frame comprising a section disposed in back of said member and generally corresponding thereto in shape and size, a plurality of elongated ornamental elements disposed about said member, said ornamental elements being provided with broad forwardly presenting surfaces, the inner marginal portions of said ornamental elements being disposed in overlapping relation to the outer marginal portion of said member, and each pair of opposed end portions of said ornamental elements being complementally mitered across their broad forwardly presenting surfaces, a plurality of brackets secured to said back section and provided with elongated appendages extending outwardly from said back section, said appendages being provided with broad forwardly presenting surfaces which slope forwardly and outwardly, there being one such appendage disposed in underlying relation to each pair of opposed end portions of said ornamental elements, and a plurality of elongated fittings, there being one such fitting disposed in covering relation to each pair of opposed end portions of said ornamental elements, said fitting being provided with a pair of L-shaped parts detachably secured respectively to the opposite end portions of the underlying appendage in fixed relation to one another with the proximate legs of said parts disposed in a common plane, and a main body part in the form of a longitudinally extending channel, said main body part being disposed between said pair of parts with said proximate legs of the latter slidably engaged respectively in opposite end portions of said channel and with the remote legs of the same projecting laterally thereof in the same direction and respectively abutting the proximate edges of the pair of opposed end portions of the ornamental elements, the latter being thereby clamped between said fittings and their underlying appendages, and being disposed thereby in forwardly and outwardly sloping relation to said member.

6. In combination, a frame and a member mounted therein, said frame comprising a section disposed in back of said member and generally corresponding thereto in shape and size, means for securing together said back section and mirror, a plurality of elongated ornamental elements disposed about said member, said ornamental elements being provided with broad forwardly presenting surfaces, the inner marginal portions of said ornamental elements being disposed in overlapping relation to the outer marginal portion of said member, and each pair of opposed end portions of said ornamental elements being complementally mitered across their broad forwardly presenting surfaces, a plurality of appendages extending outwardly from said back section, there being one such appendage disposed in underlying relation to each pair of opposed end portions of said ornamental elements, and a plurality of fittings, there being one such fitting disposed in covering relation to each pair of opposed end portions of said ornamental elements, the latter being thereby clamped between said fittings and their underlying appendages and being disposed thereby in forwardly and outwardly sloping relation to said member.

7. In combination, a frame and a member mounted therein, said frame comprising a section disposed in back of said member and generally corresponding thereto in shape and size, means for securing together said back section and mirror, a plurality of elongated ornamental elements disposed about said member, said ornamental elements being provided with broad forwardly presenting surfaces, the inner marginal portions of said ornamental elements being disposed in overlapping relation to the outer marginal portion of said member, and each pair of opposed end portions of said ornamental elements being complementally mitered across their broad forwardly presenting surfaces, a plurality of appendages extending outwardly from said back section, there being one such appendage disposed in underlying relation to each pair of opposed end portions of said ornamental elements, and a plurality of fittings, there being one such fitting disposed in covering relation to each pair of opposed end portions of said ornamental elements, the latter being thereby clamped between said fittings and their underlying appendages independently of said means for securing together said back section and mirror.

8. In combination, a frame and a member mounted therein, said frame comprising a section disposed in back of said member and generally corresponding thereto in shape and size, said back section including a panel part, and means marginally disposed between said panel and member, said means being effective to maintain said panel and member in relatively spaced relation, a plurality of elongated ornamental elements disposed about said member, said ornamental elements being provided with broad forwardly presenting surfaces, the inner marginal portions of said ornamental elements being disposed in overlapping relation to the outer marginal portion of said member, and each pair of opposed end portions of said ornamental elements being complementally mitered across their broad forwardly presenting surfaces, a plurality of brackets each provided with a part secured to said panel and disposed between component elements of said means, each such bracket having an integral appendage extending outwardly from said back section, there being one such appendage disposed in underlying relation to each pair of opposed end portions of said ornamental elements, and a plurality of clamp fittings operatively associated with said brackets, there being one such fitting disposed in covering relation to each pair of proximate end portions of said ornamental elements, the latter being thereby clamped between said fittings and the underlying appendages of said brackets.

9. In combination, a frame and a member mounted therein, said frame comprising a section disposed in back of said member and generally corresponding thereto in shape and size, said back section including a panel part, and means marginally disposed between said panel and member, said means being effective to maintain said panel and member in relatively spaced relation, a plurality of elongated ornamental elements disposed about said member, said ornamental elements being provided with broad forwardly presenting surfaces, the inner marginal portions of said ornamental elements being disposed in overlapping relation to the outer marginal portion of said member, and each pair of opposed end portions of said ornamental elements being complementally mitered across their broad forwardly presenting surfaces, a plurality of brackets each provided with a part secured to said panel and disposed between component elements of said means, each such bracket having a pair of integral arms secured respectively to said component elements and an integral appendage extending outwardly from said back section, there being one such appendage disposed in underlying relation to each pair of opposed end portions of said ornamental elements, and a plurality of clamp fittings operatively associated with said brackets, there being one such fitting disposed in covering relation to each pair of proximate end portions of said ornamental elements, the latter being thereby clamped between said fittings and the underlying appendages of said brackets.

10. In combination, a frame and a member mounted therein, said frame comprising a section disposed in back of said member and generally corresponding thereto in shape and size, said back section including a panel part, and means marginally disposed between said panel and member, said means being effective to maintain said panel and member in relatively spaced relation, a plurality of elongated ornamental elements disposed about said member, said ornamental elements being provided with broad forwardly presenting surfaces, the inner marginal portions of said ornamental elements being disposed in overlapping relation to the outer marginal portion of said member, and each pair of opposed end portions of said ornamental elements being complementally mitered across their broad forwardly presenting surfaces, a plurality of brackets each provided with a part secured to said panel and disposed between component elements of said means, each such bracket having a pair of integral arms secured to said component elements and disposed respectively in side abutting relation thereto, with shock absorbing means between said arms and said member, and having also an integral appendage extending outwardly from said back section, there being one such appendage disposed in underlying relation to each pair of opposed end portions of said ornamental elements, and a plurality of clamp fittings operatively associated with said brackets, there being one such fitting disposed in covering relation to each pair of proximate end portions of said ornamental elements, the latter being thereby clamped between said fittings and the underlying appendages of said brackets.

11. In combination, a frame and a member mounted therein, said frame comprising a section disposed in back of said member and generally corresponding thereto in shape and size, said back section including a panel part, and means marginally disposed between said panel and member, said means being effective to maintain said panel and member in relatively spaced relation, a plurality of elongated ornamental elements disposed about said member, said ornamental elements being provided with broad forwardly presenting surfaces, the inner marginal portions of said ornamental elements being disposed in overlapping relation to the outer marginal portion of said member, and each pair of opposed end portions of said ornamental elements being complementally mitered across their broad forwardly presenting surfaces, a plurality of brackets each provided with a part secured to said panel and disposed between component elements of said means, each such bracket having a pair of integral arms secured to said component elements and disposed respectively in side abutting relation thereto, with shock absorbing means between said arms and said member, and having also an integral appendage forwardly offset relative to said bracket part and extending outwardly from said back section, there being one such appendage disposed in underlying relation to each pair of opposed end portions of said ornamental elements, and a plurality of clamp fittings operatively associated with said brackets, there being one such fitting disposed in covering relation to each pair of proximate end portions of said ornamental elements, the latter being thereby clamped between said fittings and the underlying appendages of said brackets.

12. In combination, a frame and a member mounted therein, said frame comprising a section generally corresponding to said member in shape and size and disposed in back of said member in close adjacent relation thereto, a plurality of elongated ornamental elements disposed about said member, said ornamental elements being provided with broad forwardly presenting surfaces, the inner marginal portions of said ornamental elements being disposed in overlapping relation to the outer marginal portion of said member, and each pair of opposed end portions of said ornamental elements being complementally mitered across their broad forwardly presenting surfaces, a plurality of brackets each provided with a part secured to the back of said section and with an integral elongated appendage extending outwardly from said back section, there being one such appendage disposed in underlying relation to each pair of opposed end portions of said ornamental elements, and a plurality of fittings, there being one such fitting disposed in covering relation to each pair of opposed end portions of said ornamental elements, the latter being thereby clamped between said fittings and their underlying appendages.

13. In combination, a frame and a member mounted therein, said frame comprising a section generally corresponding to said member in shape and size and secured to the back of said member through the medium of an adhesive agent, a plurality of elongated ornamental elements disposed about said member, said ornamental elements being provided with broad forwardly presenting surfaces, the inner marginal portions of said ornamental elements being disposed in overlapping relation to the outer marginal portion of said member, and each pair of proximate end portions of said ornamental elements being complementally mitered across their broad forwardly presenting surfaces, a plurality of brackets each provided with a part secured to the back of said section and with an integral elongated appendage extending outwardly from said back section, said appendage being provided with a broad forwardly presenting surface, there being one such appendage disposed in underlying relation to each pair of proximate end portions of said ornamental elements, and a plurality of elongated fittings, said fittings being each provided with a broad forwardly presenting surface and with opposite end portions detachably secured respectively to corresponding end portions of the underlying appendage, there being one such fitting disposed in covering relation to each pair of opposed end portions of said ornamental elements, the latter being thereby clamped between said fittings and their underlying appendages.

References Cited in the file of this patent

UNITED STATES PATENTS

| 587,241 | Seidel | July 27, 1897 |
| 776,316 | Gardner | Nov. 29, 1904 |
| 1,802,999 | Budd | Apr. 28, 1931 |
| 2,656,632 | Detje | Oct. 27, 1953 |

FOREIGN PATENTS

| 619,766 | Great Britain | Mar. 15, 1949 |